(12) United States Patent
Feldmann

(10) Patent No.: US 8,186,623 B2
(45) Date of Patent: May 29, 2012

(54) CONTROLLABLE DROGUE

(75) Inventor: Michael S. Feldmann, Grand Rapids, MI (US)

(73) Assignee: GE Aviation Systems, LLC, Grand Rapids, MI (US)

(*) Notice: Subject to any disclaimer, the term of this patent is extended or adjusted under 35 U.S.C. 154(b) by 908 days.

(21) Appl. No.: 12/162,228

(22) PCT Filed: Dec. 22, 2006

(86) PCT No.: PCT/US2006/049258
§ 371 (c)(1),
(2), (4) Date: Oct. 3, 2008

(87) PCT Pub. No.: WO2008/045116
PCT Pub. Date: Apr. 17, 2008

(65) Prior Publication Data
US 2010/0001124 A1  Jan. 7, 2010

Related U.S. Application Data

(60) Provisional application No. 60/752,380, filed on Dec. 22, 2005.

(51) Int. Cl.
*B64D 39/00* (2006.01)
(52) U.S. Cl. .................................. 244/135 A
(58) Field of Classification Search ........... 244/1 TD, 244/135 R, 135 A
See application file for complete search history.

(56) References Cited

U.S. PATENT DOCUMENTS

| | | | |
|---|---|---|---|
| 3,011,737 A | 12/1961 | Morrow | |
| 3,091,419 A * | 5/1963 | Mosher | 244/135 A |
| 4,072,283 A * | 2/1978 | Weiland | 244/135 A |
| 4,438,793 A | 3/1984 | Brown | |
| 5,326,052 A | 7/1994 | Krispin | |
| 5,427,333 A | 6/1995 | Kirkland | |
| 6,604,711 B1 | 8/2003 | Stevens et al. | |
| 6,926,049 B1 | 8/2005 | Enig et al. | |

FOREIGN PATENT DOCUMENTS
WO   02/055385 A1   7/2002

OTHER PUBLICATIONS

Supplementary EP Search Report from corresponding EP Application No. 06851802.6, Nov. 18, 2011.

* cited by examiner

*Primary Examiner* — Rob Swiatek
(74) *Attorney, Agent, or Firm* — Global Patent Operation; Jonathan E. Thomas

(57) ABSTRACT

A refueling drogue assembly including a refueling drogue receptacle, a control unit including a duct, and a refueling hose connector adapted to rigidly couple the control unit to an aerial refueling hose. In some embodiments, the control unit is flexibly coupled to the refueling drogue receptacle. In some embodiments, the control unit is adapted to change an orientation of at least a portion of the duct relative to a longitudinal axis of the control unit.

29 Claims, 17 Drawing Sheets

CONTROLLABLE DROGUE

CROSS-REFERENCE TO RELATED PATENT APPLICATIONS

This application claims priority to U.S. Provisional Patent Application Ser. No. 60/752,380 to Michael Feldmann of Grand Rapids Mich., entitled Controllable Drogue, filed on Dec. 22, 2005, the contents of which are incorporated herein in their entirety.

BACKGROUND OF THE INVENTION

Aerial refueling via the probe and drogue method is known. In an exemplary refueling scenario, a refueling drogue receptacle connected to a refueling hose is unreeled from a refueling aircraft towards a receiver aircraft (an aircraft to be refueled), such as a fighter plane. The receiver aircraft has a refueling probe extending from the aircraft. The receiver aircraft maneuvers to the refueling drogue and inserts its refueling probe into the refueling drogue receptacle, at which point the refueling drogue receptacle "locks" onto the refueling probe (at least if there is sufficient drag force generated by the drogue to allow the receiver aircraft probe to push on the "over-center" rollers with enough force to activate the locking mechanism), and a transfer of fuel from the refueling aircraft to the receiver aircraft is conducted.

In the example above, it is desirable that the drogue remain as stationary as possible and/or that the drogue not rotate when extended from the refueling hose away from the refueling aircraft towards the receiver aircraft, at least before contact between the drogue and the probe is made. Unfortunately, the hose-drogue combination has a relatively large dynamic response to disturbances, so when the drogue is subjected to wind gusts and/or turbulence and/or refueling (tanker) aircraft wake, and/or bow wave effects, the motion of the drogue becomes somewhat unpredictable, as forces imparted onto the drogue by the air cause the drogue to move and/or rotate, thus making it difficult to position the refueling probe of the aircraft to be refueled into the refueling drogue. Both low frequency disturbances (e.g., bow wave, etc.) and high-frequency disturbances (e.g., turbulence, refueling aircraft wake, etc.) to the drogue create problems during refueling operations, creating disturbance responses in the drogue.

Thus, there is a need to reduce the disturbance response of a refueling drogue that has been extended on a refueling hose so that the movement of the drogue resulting from wind/turbulence is substantially reduced to improve the ease by which the refueling probe can be inserted in the refueling drogue.

DETAILED DESCRIPTION OF SOME OF THE EMBODIMENTS

Figure 1:
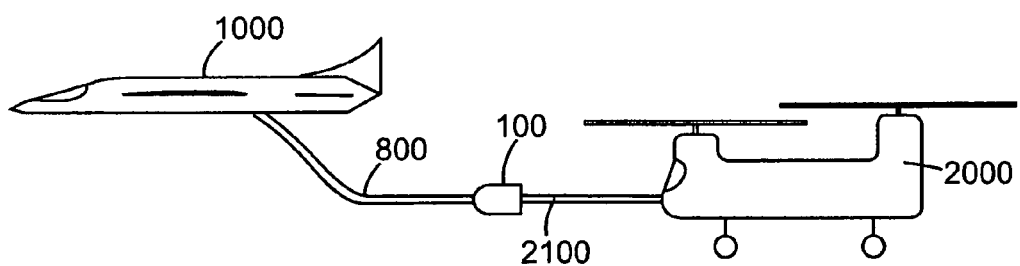
FIG. 1 depicts an implementation of an embodiment of the present invention.

FIG. 1 presents a schematic of the refueling drogue assembly 100 according to an embodiment of the present invention being utilized to refuel a receiver aircraft 2000 by a tanker aircraft 1000. In FIG. 1, it may be seen that a refueling drogue assembly 100 extends from the tanker 1000. Refueling drogue assembly 100 is further connected to refueling probe 2100 extending from the receiver aircraft 2000. In the first embodiment of the invention, once the refueling probe 2100 of the receiver aircraft 2000 is captured in the refueling drogue assembly 100, aviation fuel may be transferred from the tanker 1000 through the refueling drogue assembly 100, and then through the refueling probe 2100, and into tanks (not shown) in the receiver aircraft 2000. In the first embodiment of the invention, the refueling drogue assembly 100 is adapted to physically connect to the refueling probe 2100. Connection can be performed in some embodiments per military standards. In the first embodiment of the invention, the refueling hose 800 is approximately three inches in interior diameter, while in other embodiments, it is approximately two inches or four inches in interior diameter. In some embodiments, the hose is about 2.375, 2.625 and 2.875 inches in interior diameter. Thus, some embodiments of the present invention may be practiced with hoses of different sizes depending on the desired maximum fuel off loads of the refueling aircraft. In other embodiments of the invention, the hose outside diameter is about 2 inches.

Figure 2:
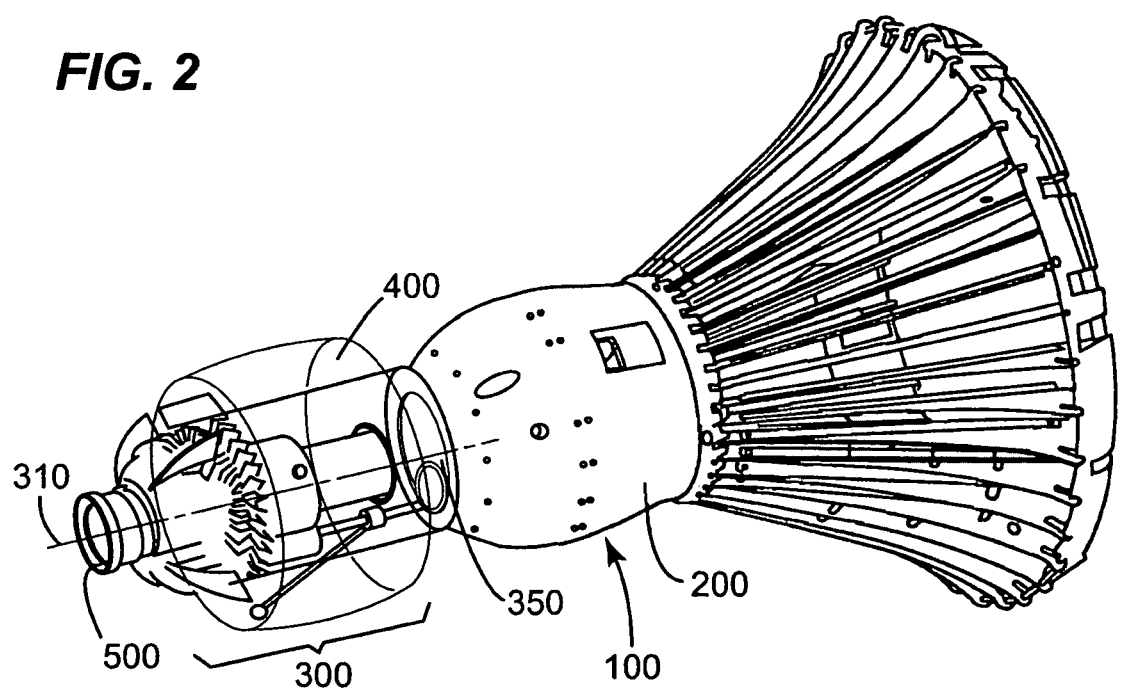
FIG. 2 depicts an isometric view of an embodiment of the present invention.

FIG. 2 depicts a more detailed view of the refueling drogue assembly 100 depicted in FIG. 1. In FIG. 2, the refueling drogue assembly 100 comprises a refueling drogue receptacle 200, a control unit 300 including a duct 400, and a refueling hose connector 500 adapted to rigidly couple/connect the control unit 300 to the aerial refueling hose 800. The refueling drogue assembly 100 of this embodiment utilizes the duct 400 to control and/or stabilize, and/or "station keep" and/or maneuver the refueling drogue assembly 100 so as to improve aerial refueling capabilities. As may be seen, the duct 400 presented in the figures is an annular duct, although in other embodiments of the present invention, the duct may be elliptical or of other shapes, such as, for example, rectangular.

In a first embodiment of the present invention, the control unit 300 is flexibly coupled to the refueling drogue receptacle 200 by a ball joint 350, and the control unit 300 is adapted to change an orientation of at least a portion of the duct 400 relative to a longitudinal axis 310 of the control unit 300. By changing the orientation of at least a portion of the duct 400, the refueling drogue assembly may be controlled and/or stabilized as it is being dragged through the air behind a refueling aircraft 1000, such as a KC-135 and/or A-6 refueling aircraft and/or KC-130 and/or rotary wing refueling aircraft 1000 as shown in FIG. 1. The terms "Control" and "stabilize" as used herein are defined in greater detail below and are also defined in co-pending U.S. patent application Ser. No. 10/849,927 to Frank Saggio, William Ribbons and Kean Ooi, entitled Active Stabilization of a Refueling Drogue (which also details teachings regarding active control of a refueling drogue), filed May 21, 2004, the contents of which are incorporated herein in its entirety. However, for the moment, it will suffice to say that "control" refers to the capability to vary and/or maintain the location of the end portion of the refueling drogue assembly (e.g., the drogue receptacle 200, the control unit 300 and at least the tail portion of the refueling hose 800) in an airstream, while "stabilize" refers to the capability to stabilize the refueling drogue assembly (especially the components rigidly coupled to the refueling hose but also the refueling drogue receptacle 200, although to a somewhat lesser extent, as it may be flexibly coupled to the control unit 300) so that it does not oscillate wildly in an airstream.

Particular details of the present invention will now be described.

As may be seen in FIG. 2, the refueling drogue assemble 100 according to the present invention may be designed to be modularized. That is, for example, the refueling drogue receptacle 200 may be a separate and distinct component readily detachable and attachable to the control unit 300. The control unit 300, in turn, may be readily detachable from and attachable to the refueling hose 800 via the refueling hose connector 500. The refueling drogue receptacle 200 may be readily connected to and detached from the control unit 300 via the ball joint coupling 350 which itself includes a connector. In some embodiment of the present invention, the drogue receptacle 200 may be a traditional refueling drogue such as that depicted in FIG. 3.

Figure 3:
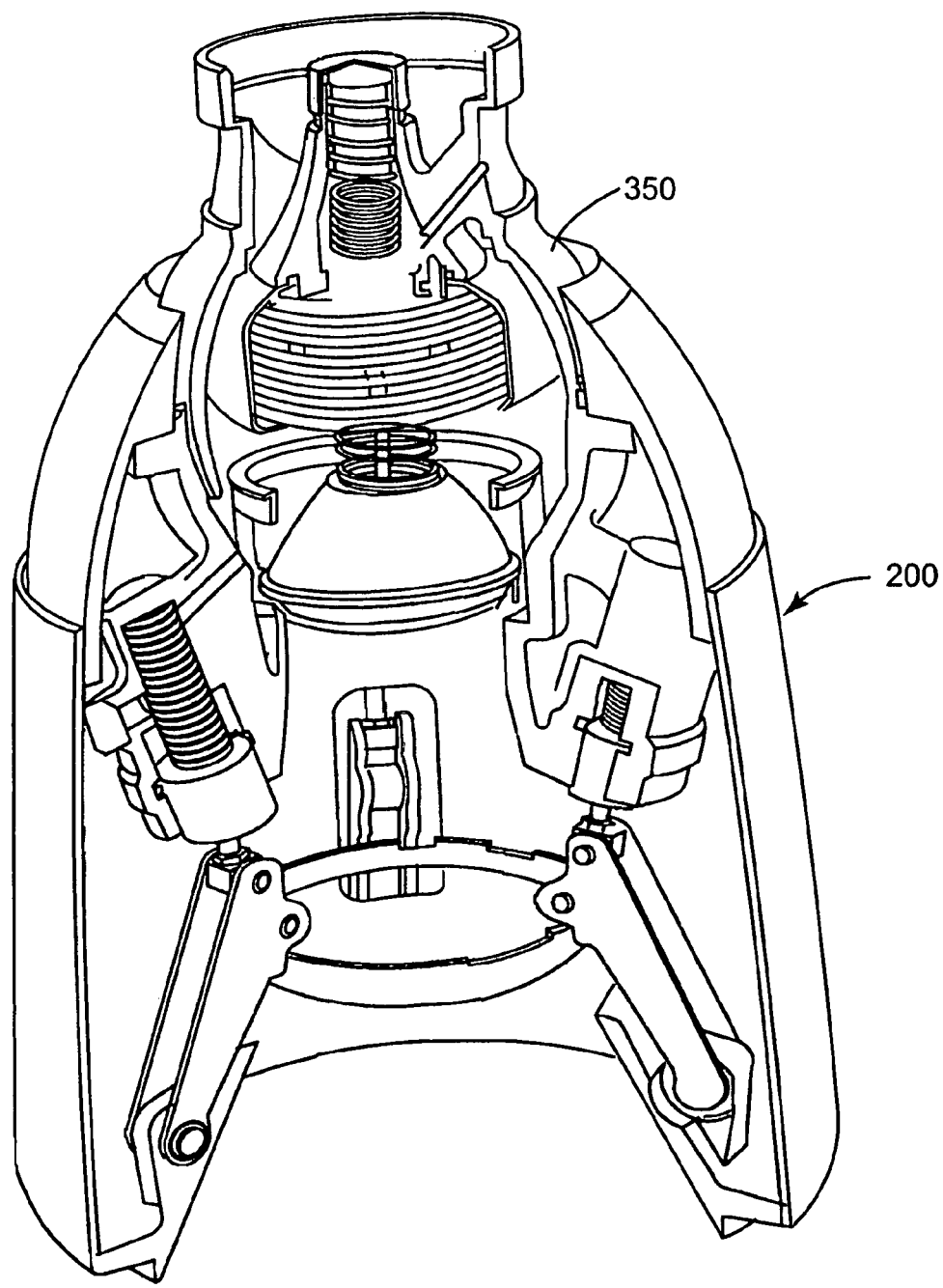
FIG. 3 depicts a prior art aerial refueling receptacle.

As may be seen in FIG. 3, the traditional refueling drogue receptacle depicted therein may include a ball joint coupling 350 built into the refueling drogue receptacle. Other embodiments, however, may be practiced with drogue bodies that do not include the flexible joint/flexible coupling, but may be retrofitted with a flexible joint/flexible coupling so that the control unit 300 may be flexibly coupled to the drogue receptacle 200. Because some embodiments of the present invention include a control unit 300 that is configured to readily attach to a connector (such as the ball joint coupling 350) on the traditional refueling drogue receptacle 200, some embodiments of the present invention include the ability to retrofit the existing refueling drogue assemblies currently in the field/currently being produced. In this regard, according to an embodiment of the present invention, a control unit 300 may be placed in between an existing drogue receptacle and a refueling hose to upgrade an existing system to operate in accordance with the teachings detailed herein. Accordingly, some embodiments of the present invention include a retrofit kit including a control unit 300 according to some or all embodiments detailed herein.

In the control unit 300 depicted in the figures, there is an aviation fuel conduit 510 that passes through the control unit 300. This aviation fuel conduit 510 may be placed into fluid communication with the refueling drogue receptacle 200, and also placed into fluid communication with the refueling hose 800. This aviation fuel conduit 510 in some embodiments of the present invention passes substantially through the center of the control unit 300 so that it may extend from the refueling hose 800 to the refueling drogue receptacle 200. As may be seen in the figures, the duct 400 may surround the aviation fuel conduit 510. That is, in some embodiments of the present invention, the aviation fuel conduit 510 passes directly though the duct 400. Thus, there is an obstruction inside the duct that restricts airflow flowing through the interior of the duct 400. Accordingly, when designing and selecting duct geometries, the fact that the conduit and other components create an air blockage/obstruction on the inside of the duct may be taken into account with respect to performance characteristics of the refueling drogue assembly 100.

Figure 4:
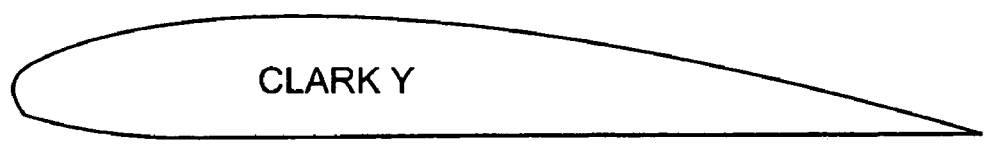
FIG. 4 depicts an airfoil utilized in an embodiment of the present invention.

In some embodiments of the present invention, the duct 400 has a cross-section of a teardrop. By teardrop, it is meant a shape that resembles a teardrop in that it has a varying width such that the greater width is biased closer to one end than the other. However, this does not mean that the cross-section of the duct is symmetrical, although in some embodiments it may very well be symmetrical. For example, in some embodiments of the present invention, the duct has a cross-section of an NACA 0012 airflow which has no camber. Conversely, in other embodiments, the cross-section of the duct 400 is that of the Clark Y airflow, as is shown in FIG. 4. In some embodiments, the airfoil utilized to form the duct 400 may have a bottom side that is flat after roughly 30 percent of the chord length. An airfoil with an increased thickness may also be utilized. In some embodiments, represented by a model having a chord length which may be about 0.75 inches with a diameter of about 0.75 inches providing an aspect ratio of about 2.02 exists which may be utilized for wind tunnel testing, where this model would be scaled up for actual use. In other embodiments, the airfoil had a chord length of 1 foot and a diameter of one foot, for an aspect ratio of about 1. In some embodiments of the present invention, the outside of the airfoil may be quite rough, increasing the likelihood that airflow about the duct 400 will be turbulent.

Figure 5:
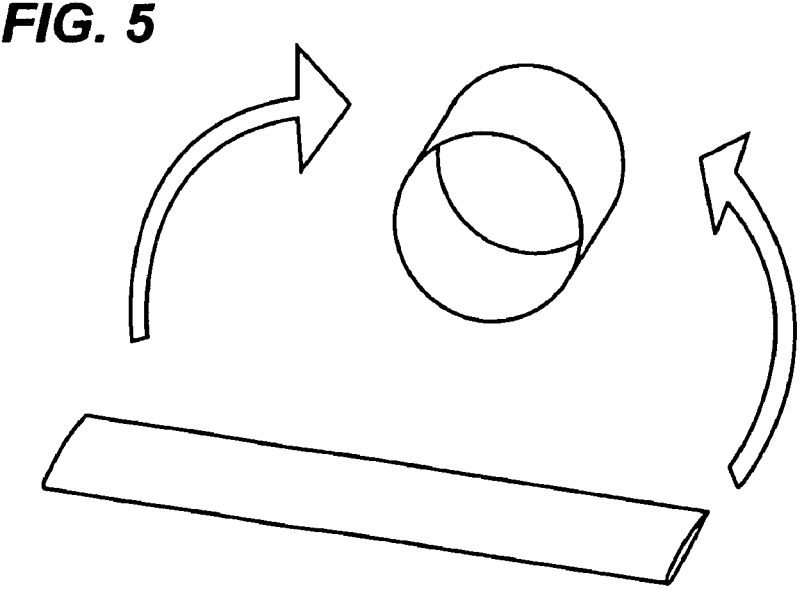
FIG. 5 depicts an assembly method utilized to fabricate a portion of a device according to an embodiment of the present invention.
Figure 6:
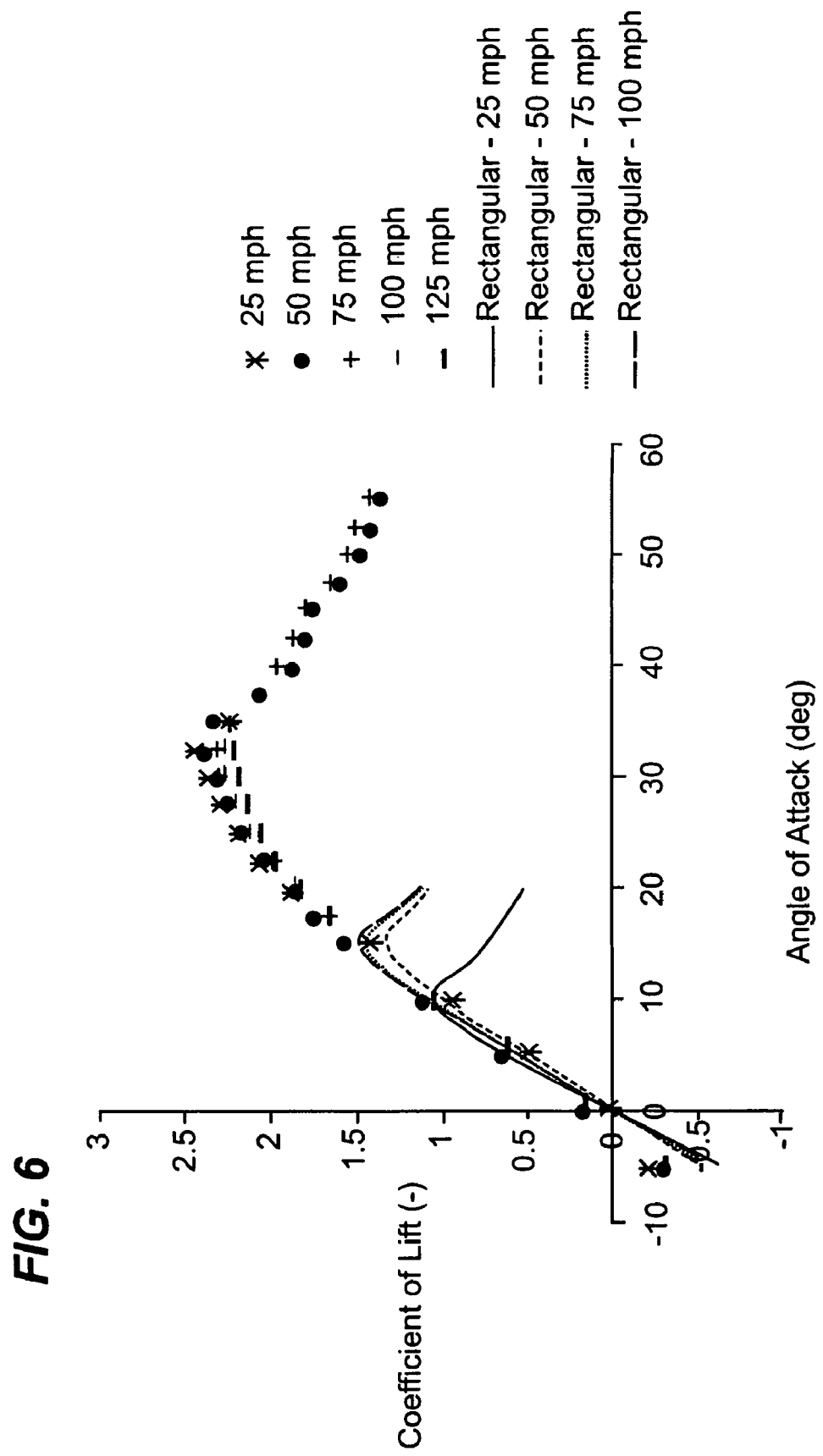
FIGS. 6 to 9 present empirical data relating to some embodiments of the present invention.
Figure 7:
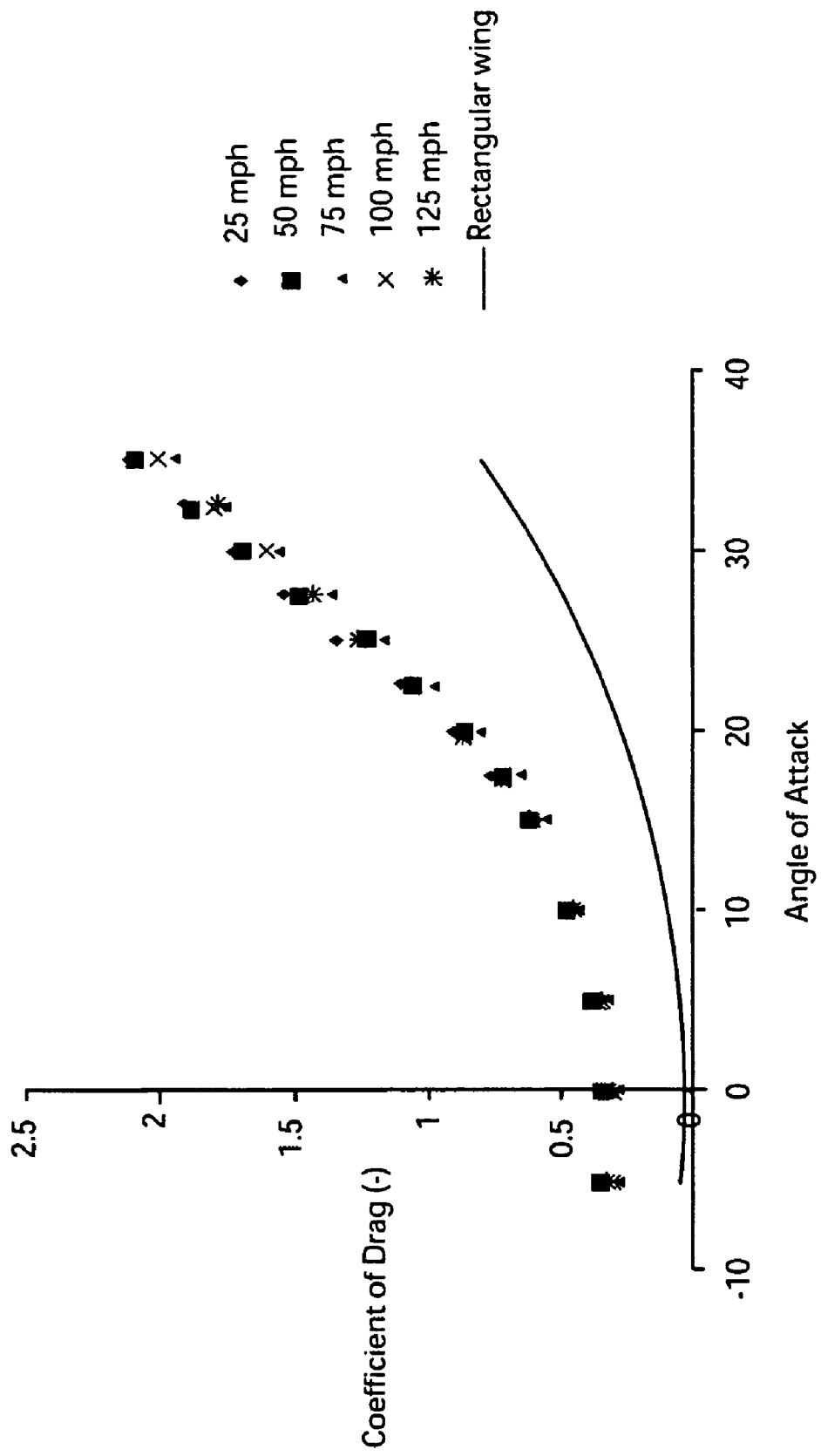
Figure 8:
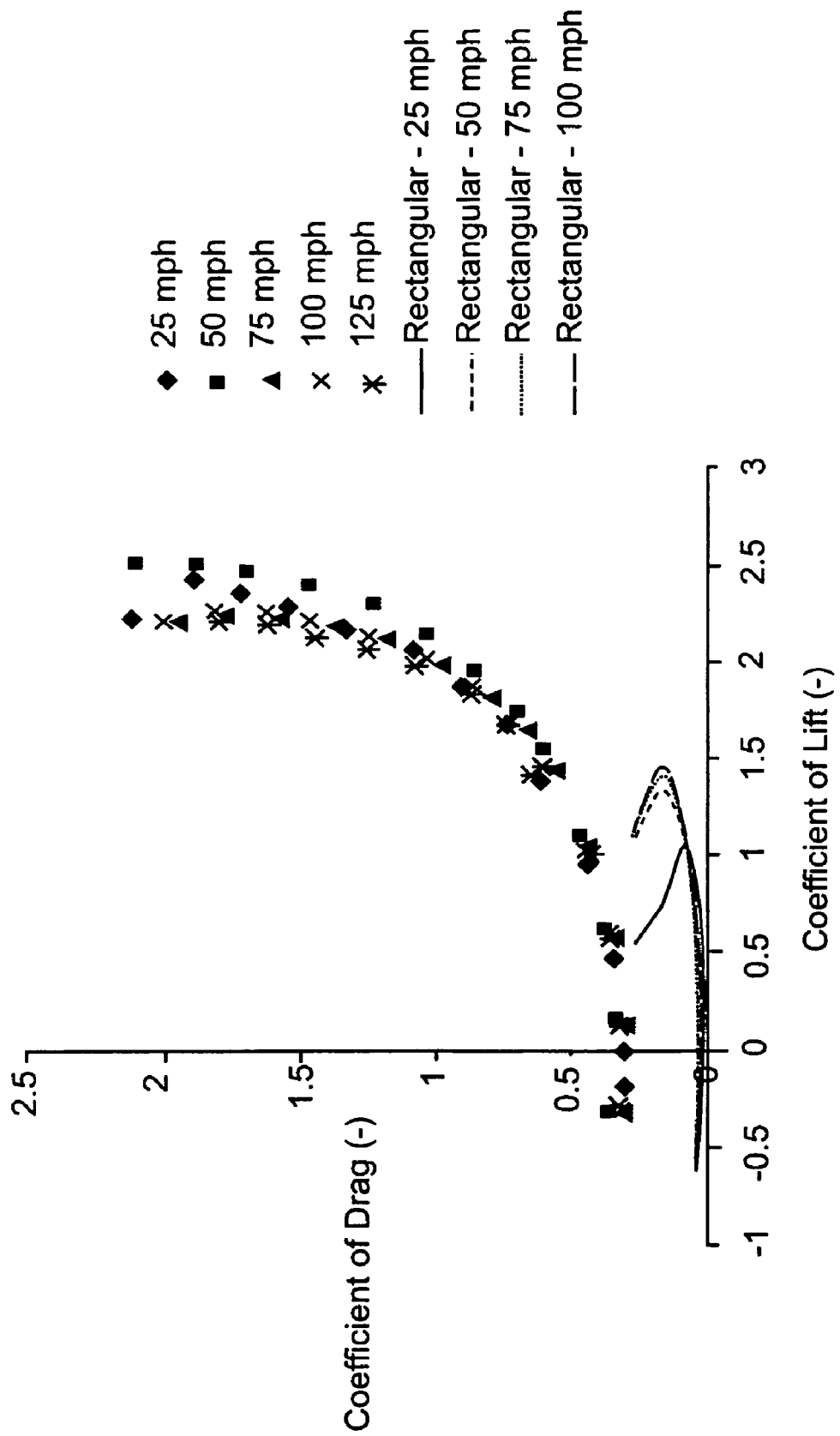
Figure 9:
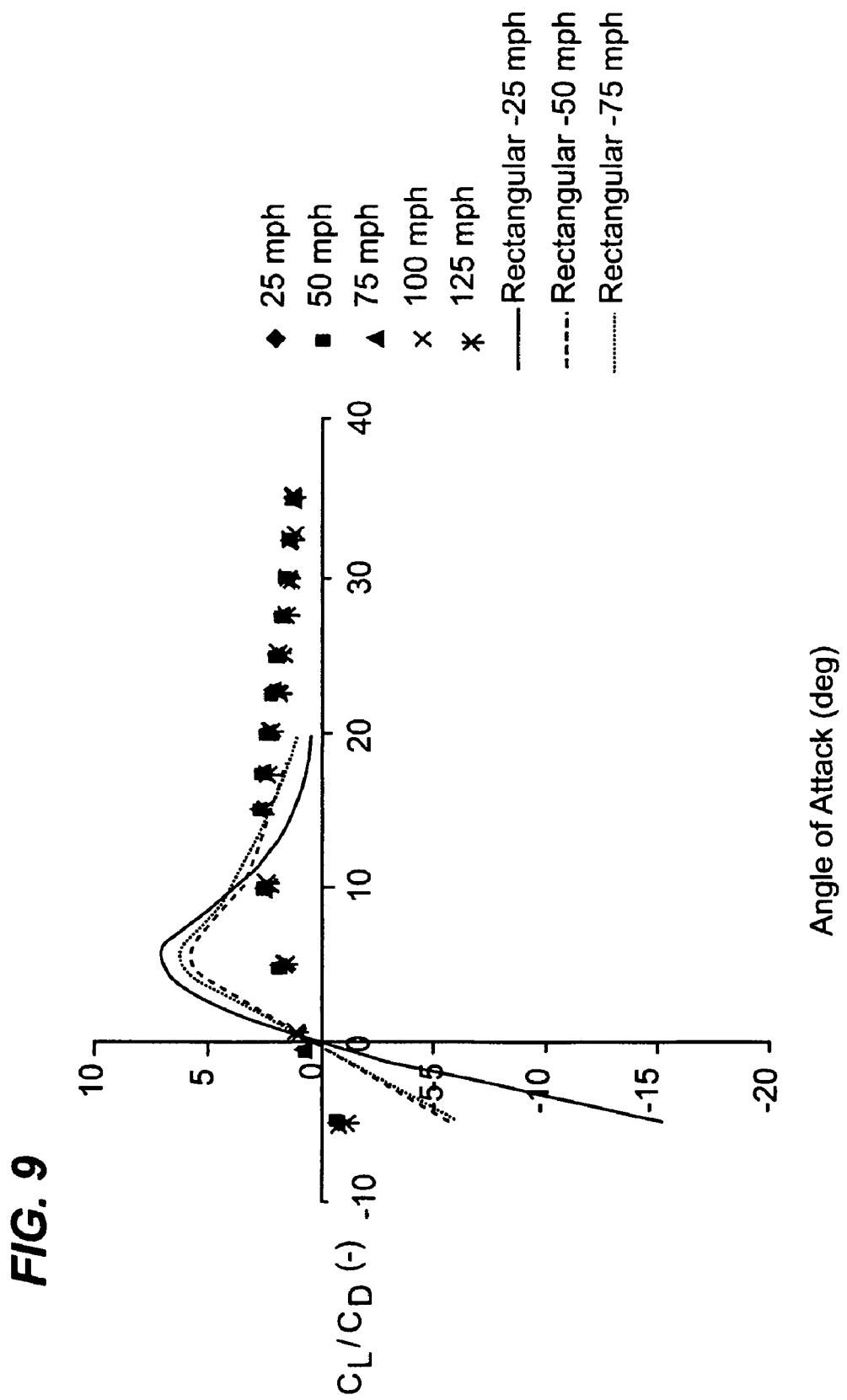

In some embodiments of the present invention, the duct 400 may be obtained by first obtaining a planar airfoil and wrapping it into a cylinder, as may be seen in FIG. 5.

FIGS. 6-9 present performance data for an exemplary duct 400 having a cross-section of an NACA 0012 airfoil.

Figure 10:
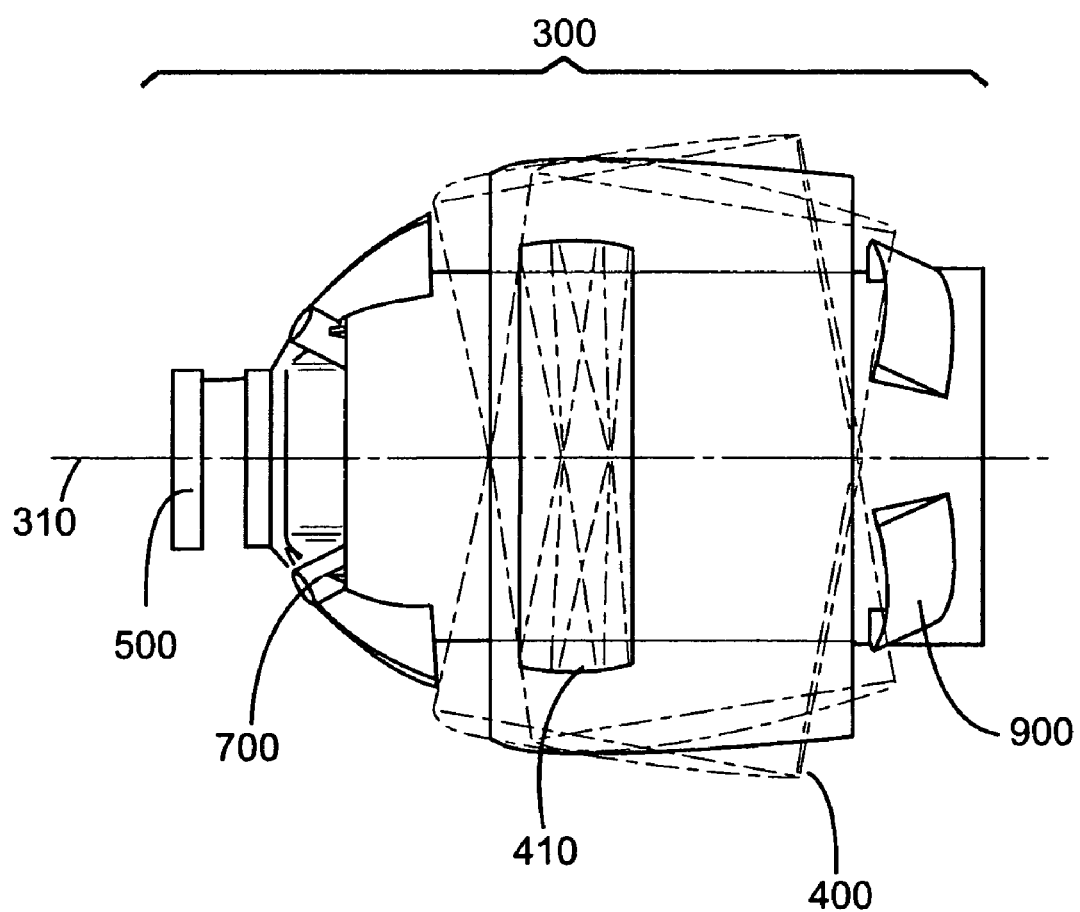
FIG. 10 presents a side view of a component of an embodiment of the present invention.
Figure 11:
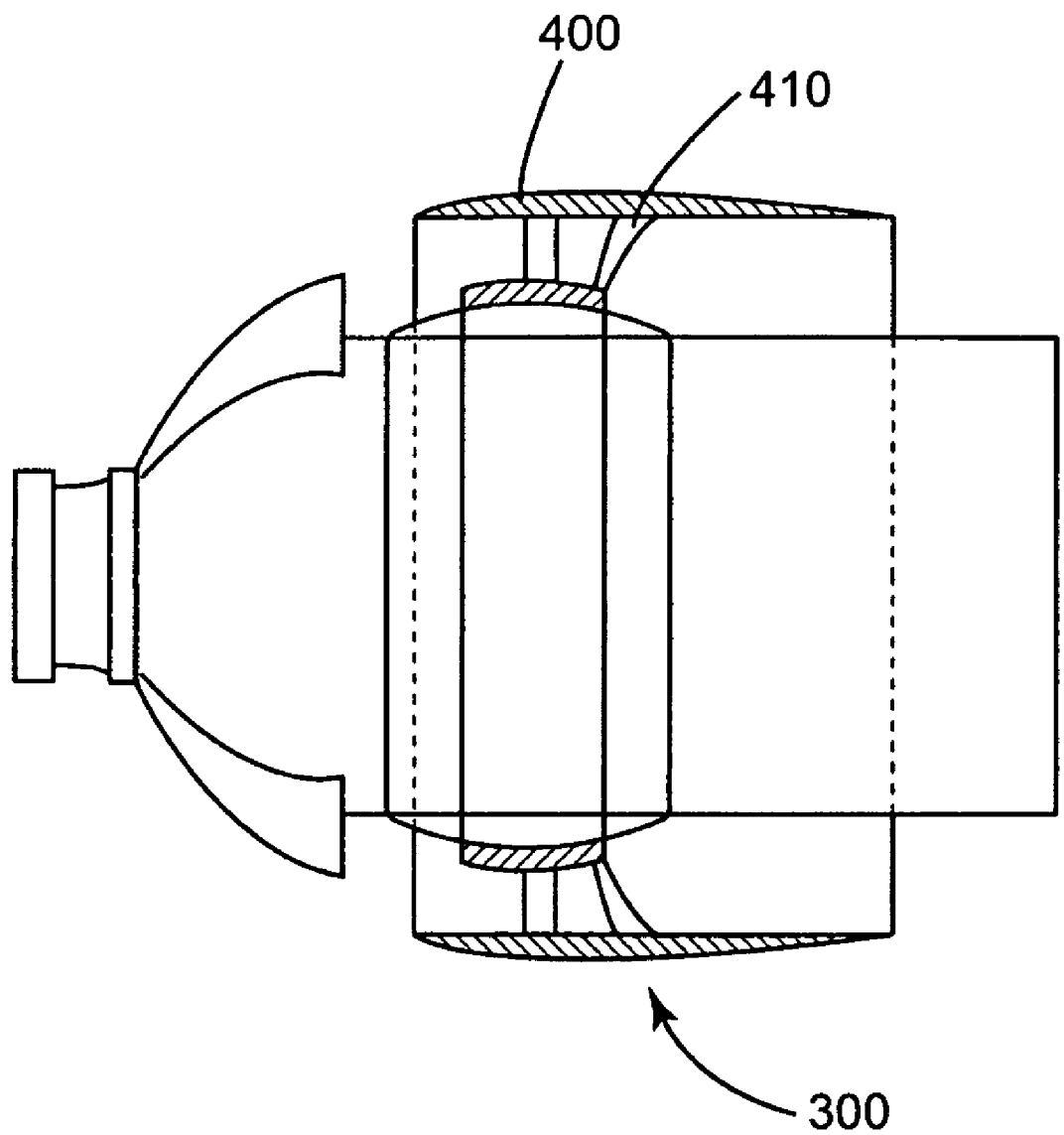
FIG. 11 presents another side view of a component of an embodiment of the present invention.

Referring to FIGS. 10 and 11, it may be seen that some embodiments of the present invention include a ball joint 410 on which the duct 400 is mounted. Specifically, the sleeve of the ball joint 410 is adapted to slide about the ball of the ball joint 410 such that the orientation of the duct 400, which is connected to the sleeve of the ball joint 410, changes with respect to a longitudinal axis 310 of the control unit 300 such that the duct 400 may pitch/yaw in some directions/any desired direction. FIG. 10 depicts the duct 400 in a position that is substantially aligned with the longitudinal axis of the control unit 310 superimposed upon a depiction of the duct 400 at a first angle with respect to the longitudinal axis 310 and superimposed upon a depiction of the duct 310 at a second angle with respect to the longitudinal axis 310. As may be seen in FIGS. 10 and 11, the ball of ball joint 410 need not be a perfect/complete sphere. It may be a section of a sphere or a sphere-like object, as long as there is sufficient surface for the sleeve of the ball joint 410 to slide or otherwise travel about the ball of the ball joint 410, the ball may be of any sufficient size/shape/geometry. It will be noted that other embodiments of the present invention, a ball joint is not used. For example, the duct 400 may be mounted on pylons that move in a choreographed manner to change the alignment of the duct 400 with respect to the longitudinal axis 310 of the control unit 300. In other embodiments, an elastomeric support system supporting the duct 400 may be utilized. Any device, system or method that will permit a sufficient change in the orientation of the duct 400 with respect to the longitudinal axis 310 may be utilized to practice some embodiments of the present invention.

It will be noted that other embodiments of the present invention may be practiced without changing the orientation of the entire duct 400. In this regard, some embodiments of the present invention may be practiced such that a portion of the duct geometry changes while other portions of the duct remain the same with respect to the longitudinal axis 310. In this regard, for example, the duct 400/portions of the duct 400 may be made from a material that reacts to an electrical charge and deforms in response to the electrical charge. Here, the duct 400 may deform such that lift and/or drag is created at locations which will be utilized to control and/or stabilize the refueling drogue assembly 100 as desired. It is also noted that some embodiments of the present invention may be practiced such that the duct does not pitch/yaw in every conceivable axis/direction. That is, while the ball joint 410 or other support structure may provide for the ability of the orientation of the duct 400 to be changed in a fully articulable manner, other embodiments of the present invention are practiced such that, for example, the longitudinal axis of the duct 400 may be moved in only a finite number of planes that pass through, for example, the longitudinal axis 310 of the control unit 300.

It is noted that while the embodiments described herein detail the orientation of the duct as being varied/controlled with respect to a feature of the control unit 300 (e.g., the longitudinal axis 310) for convenience. However, it is not necessary correlate the change in orientation of the duct 400 to the longitudinal axis 310. In other embodiments, the change in orientation of the duct 400 may be correlated to a longitudinal axis of the refueling hose 800 in the location where it attaches to the control unit 300 and/or the longitudinal axis of the refueling hose connector 500, etc., and/or any other component that provides a reference acceptable for some embodiments of the present invention to be practiced.

Figure 12:
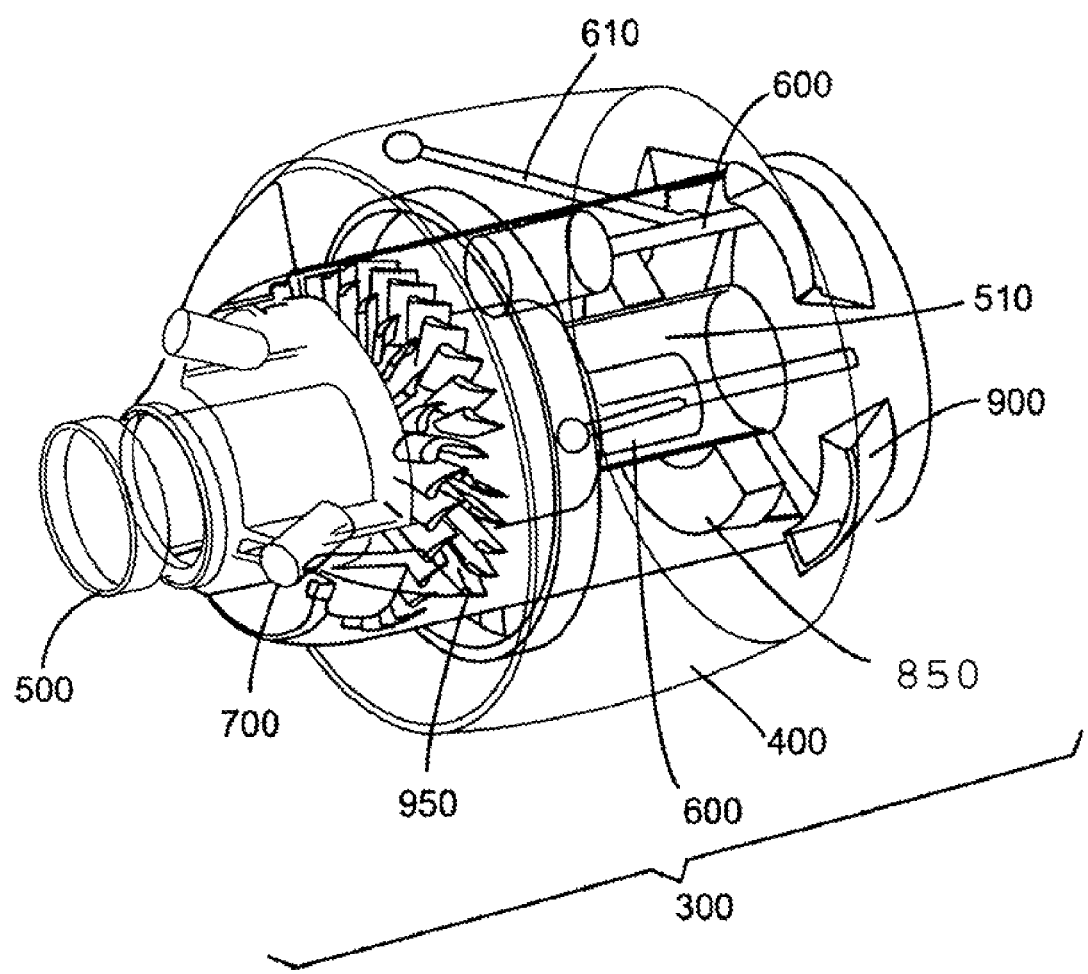
FIG. 12 presents a side view of a component of an embodiment of the present invention.

Referring now to FIG. 12, it may be seen that the control unit 300 includes a plurality of actuators 600 that are in mechanical communication with the duct 400 through control rods 610. In an embodiment of the present invention depicted in FIG. 12, the actuators 600 are adapted to change the orientation of the duct 400 relative to the longitudinal axis 310 (or other desired reference) of the control unit (or other component). In the control unit depicted in the figures, there are three actuators 600. By working together and by controlling the actuation of each actuator independently and/or collectively, the orientation of the duct 400 may be changed to a wide variety of pitch/yaw angles as measured from, for example, the axis 310. Indeed, in some embodiments, a quasi-limitless number of different orientations may be obtained, although of course the number of orientations would be limited to such design factors as actuator incremental movement control, feedback control, etc. In some embodiments of the present invention, these actuators are electrical actuators and may be electrical solenoids. In other embodiments of the present invention, the actuators are hydraulic and/or pneumatic. Any actuator which may be utilized to adequately vary the orientation of the duct 400 as desired may be utilized to practice some embodiments of the present invention. It is further noted that while piston actuators are presented in the Figs., rotary actuators and/or other types of actuators may be used. Any actuator geometry which may be utilized to vary/change the orientation of the duct 400 with respect to the longitudinal axis 310 may be utilized to practice some embodiments of the present invention.

In some embodiments of the present invention, the refueling drogue assembly 100 includes variable aerodynamic drag components that are adapted to vary the aerodynamic drag of the refueling drogue assembly 100. In this regard, it has been determined by the present inventor that the variable drag capability of some embodiments of the present invention is useful when refueling aircraft at low speeds (especially when refueling helicopter and rotary wing aircraft). Specifically, when a receiver aircraft is attempting to mate with a refueling drogue, a reaction force must be present with respect to the refueling drogue so that, in essence, the receiver aircraft has something to push against. At low speeds, the present inventor has determined that a receiver aircraft is less likely to lock onto the drogue receptacle 200, as typical drogue receptacles require the refueling boom/probe to press into the receptacle 200 with about 160 points of force, and thus if the airspeed is too low to result in 160 points of drag, the refueling boom/probe may simply push the drogue receptacle forward without locking onto the boom (i.e., at low speed, the refueling drogue assembly 100 has less drag and thus there is less force "pulling" the drogue towards the refueling aircraft (less force to react against the receiver aircraft)). Thus, the present inventor has determined that by increasing the drag on the refueling drogue this effect may be reduced/mitigated. However, it is often unnecessary to have increased drag on the refueling drogue assembly 100 for refueling at high speeds. Thus, the present inventor has developed a system whereby the aerodynamic drag of the refueling drogue assembly 100 according to the present invention may be varied as needed/desired. In this regard, referring to FIGS. 10 and 12, it may be seen that the control unit 300 further includes scoops 900 arrayed in an annular manner about the control unit 300. These scoops are configured to extend away/retract towards the axis 310, thereby increasing and reducing the aerodynamic drag on the refueling drogue assembly, respectively. In the embodiments depicted in the figures, the scoops 900 are located on a portion of the control unit 300 that houses the actuators 600. In other embodiments of the present invention, the scoops 900 may be located on the duct 400. In some embodiments of the present invention, the scoops 900 may be arrayed on the outside of the duct 400, while in other embodiments of the present invention, the scoops 900 may be arrayed on the inside of the duct 400. In yet other embodiments of the present invention, the scoops are arrayed on both the inside and the outside of the ducts 400. In some embodiments of the present invention, the scoops 900 are arrayed both on the ducts and on the housing of the actuators of the control unit 300. Indeed, in some embodiments of the present invention, the scoops 900 may be placed anywhere that may be useful to vary the aerodynamic drag on the refueling assembly 100 as desired.

Referring back to FIGS. 10 and 12, some embodiments of the present invention include a ram air turbine 950 mechanically coupled to a power generator. As the refueling drogue 100 is dragged through the atmosphere, ram air turns the turbine 950. If the turbine is connected to a power generator that is adapted to provide the refueling drogue assembly with power to change the orientation of at least a portion of the duct, control and/or stabilization as detailed herein may be accomplished without the need of an external power supply (thus greatly simplifying retrofit of existing refueling systems). In this regard, in an exemplary embodiment of the invention, the ram air turbine 950 is coupled to a hydraulic pump that supplies hydraulic pressure to the actuators 600. In some embodiments, the ram air turbine 950 may be also coupled to a generator that supplies electrical power to electrical components on the refueling drogue assembly 100. Such a generator may be utilized to charge/recharge a battery on the refueling drogue 100, etc. A ram air turbine and associated power generator may be similar to and/or the same as those taught in Stabilization of a Refueling Drogue just mentioned.

In some embodiments of the present invention, the refueling drogue assembly 100 includes an on-board processor 850 including one or more logic circuits adapted to automatically output commands to the actuators 600 to direct the actuators 600 to change the orientation of the duct 400 for control and/or stability purposes. The processor(s) 850 utilized in some embodiments include a wide-range of capabilities. In some embodiments, the processor 850 serves to receive commands from a remote control unit (such as, for example, onboard the receiver aircraft 1000) in a control system that includes a controller on the receiver aircraft 1000 and the processor 850 on the drogue 100 and determine what commands to, in turn, convey to the actuators 600, to achieve the commands from the controller on the receiver aircraft 1000 (e.g., to gain altitude, move to the left 30 inches, etc.), while in other embodiments of the present invention, sometimes in addition to the just-mentioned capabilities, the processor 850 is configured to receive input regarding performance parameters of the refueling drogue assembly, such as, for example, location (e.g., with respect to the receiver aircraft, the tanker aircraft, etc.), stability/lack of stability, etc., and automatically analyze the input regarding the performance parameters and automatically output a command to the actuators 600 to direct the actuators 600 to change the orientation of the duct 400 in response to the analysis of the input based on pre-programmed information in the processor 850. By way of example only and not by way of limitation, the present invention may be utilized with the teachings in U.S. patent application Ser. No. 11/249,262, entitled Optical Tracking System for Refueling, to Joseph G. Mickley, Raymond Stitt, Frank Saggio, Jane Pavlich and Gregory Wassick, filed on Oct. 14, 2005, the contents of which are incorporated herein in its entirety. In this regard, some or all embodiments of the refueling drogue assembly 100 according to the present invention may be substituted for the drogue assembly 100 detailed in that application, the processor(s) 850/control systems according to the present invention having some or all of the capabilities as the processors/control systems detailed in that application. Conversely, some embodiments of the refueling drogue assembly 100 (such as those utilizing the processor(s) 850/control system of the refueling drogue 100) detailed herein may include software, firmware and hardware (including communication systems, sensors, etc.) necessary to implement some or all of the teachings of the Optical Tracking System for Refueling application just referenced. It is further noted that the duct 400 of the present invention may be utilized in combination with the control/stabilization surfaces taught by the just discussed patent applications.

Further by way of example only and not by way of limitation, the present invention may also be utilized with the teachings in U.S. patent application Ser. No. 10/849,927 entitled Active Stabilization of a Refueling Drogue (which also details teachings regarding active control of a refueling drogue), to Frank Saggio, William Ribbens and Kean Ooi, issued on 4 Jan. 7, 2010 and filed on May 21, 2004, the contents of which are incorporated herein in its entirety. In this regard, the refueling drogue assembly 100 according to the present invention may be substituted for the refueling drogue 100 detailed in that application, the processor(s) 850/control system according to the present invention having some or all of the capabilities as the processors/control systems detailed in that application. By way of example only and not by way of limitation, some embodiments of the present invention may be practiced by replacing some or all of the control surfaces of some of all of the embodiments of the refueling drogue taught therein (such as, for example, elements 600/610) with the duct 400 and its associated hardware as taught herein. Conversely, some embodiments of the refueling drogue assembly 100 (such as those utilizing the processor(s) 850/control system of the refueling drogue 100) detailed herein may include software, firmware and hardware (including communication systems, sensors, etc.) to implement the teachings of the Active Stabilization of a Refueling Drogue application just referenced. Thus, some embodiments of the present invention include some or all embodiments taught in either of the just mentioned applications as long as the embodiments include a duct 400 as taught herein, along with its associated components, to implement the teachings of those applications.

In some embodiments of the present invention, the refueling drogue 100 includes sensors and/or communication input devices 700 adapted to gather data regarding refueling drogue assembly performance/adapted to receive input from a remote device (onboard the refueling aircraft) regarding at least one of refueling drogue assembly performance and/or commands to change refueling drogue assembly performance. In this regard, the sensors 700 may be similar to or the same as the sensors detailed in the two applications Optical Tracking System for Refueling and Stabilization of a Refueling Drogue just mentioned. In some embodiments of the present invention, the sensors are adapted to gather data regarding at least one of pitch and yaw of some or all components of the refueling drogue assembly 100 such as, for example, the control unit and/or the tail end of the refueling drogue hose) with respect to a free stream airflow. In other embodiments of the present invention, the communication devices are adapted to receive input indicative of a location of the refueling drogue assembly (e.g., relative to the refueling aircraft, the receiver aircraft, etc.)

In some embodiments of the present invention, the refueling drogue assembly 100 is configured to receive commands from a remote device, such as a control unit on board the tanker aircraft 1000 from which the refueling drogue assembly 100 is extended, regarding performance requirements of the refueling drogue assembly 100. For example, in some embodiments, the refueling drogue 100 is slaved to a control unit onboard the tanker aircraft 1000 such that the control unit directly controls the actuators 600 to change the orientation of the duct 400 so as to control and/or stabilize the drogue assembly 100. In such embodiments, a feed back loop system may be employed, where performance of the refueling drogue assembly 100 may be communicated to the receiver aircraft 1000 and the receiver aircraft 1000 may direct/correct the performance of the refueling drogue assembly 100. In other embodiments of the present invention, there is no communication from the refueling drogue 100 to the receiver aircraft 1000—instead, the receiver aircraft 1000 includes sensors and the like to determine the pertinent performance characteristics of the refueling drogue assembly 100 and outputs commands based on those determined characteristics.

In other embodiments of the present invention, the refueling drogue assembly comprises an on-board control system analogous in some respect to a flight control system adapted to control and effectively actively stabilize the refueling drogue assembly as the refueling drogue assembly is dragged through the atmosphere according to any part of the teachings of either of the two applications Optical Tracking System for Refueling and Stabilization of a Refueling Drogue just mentioned.

As detailed herein, some embodiments of the present invention include methods and devices for retrofitting existing aerial refueling systems. In this regard, some embodiments include configurations that permit a control unit 300 to be included in the existing refueling systems without the need to "hard wire" the control unit 300 to the refueling aircraft. That is, the control system (including its electronic components) utilized to control and/or stabilize the refueling drogue may communicate with its separate parts (some of which may be onboard the refueling aircraft) wirelessly utilizing, for example, infrared signals, radio signals, laser signals, etc. Thus, a refueling drogue assembly 100 may be placed onto an aircraft without the need for communication wires, etc., to run along the refueling hose 800. That is, the control system may be adapted to improve ease of retrofit. (In the same regard, the ram air turbine and/or onboard power systems (battery, etc.) also permit ease of retrofit, as it may not be necessary to run power lines, etc., along the refueling hose 800.)

In some embodiments of the present invention, hinge moment vs. angle of attack of the duct with respect to a free stream velocity may be linear and congruent at low angles of attack up to about 5 degrees. Hinge moment may be considered a measurement of the amount of force an actuator would have to produce to move the duct 400 at a given speed and/or to a given angle and/or angular displacement. At higher angles, the hingemoment coefficient may decrease with increased Reynolds number. At about 10 degrees angle of attack, in some embodiments, there may be a resonance and then a drastic drop off as the angle increases beyond 10 degrees. In some embodiments, once stall was reached, hinge moment may increase rapidly.

It is noted that while the phrase "duct" is utilized herein, it also includes the phrase annular airfoil (or circular wing) or any other device that may be utilized as a control device to practice embodiments of the present invention.

Figure 13:
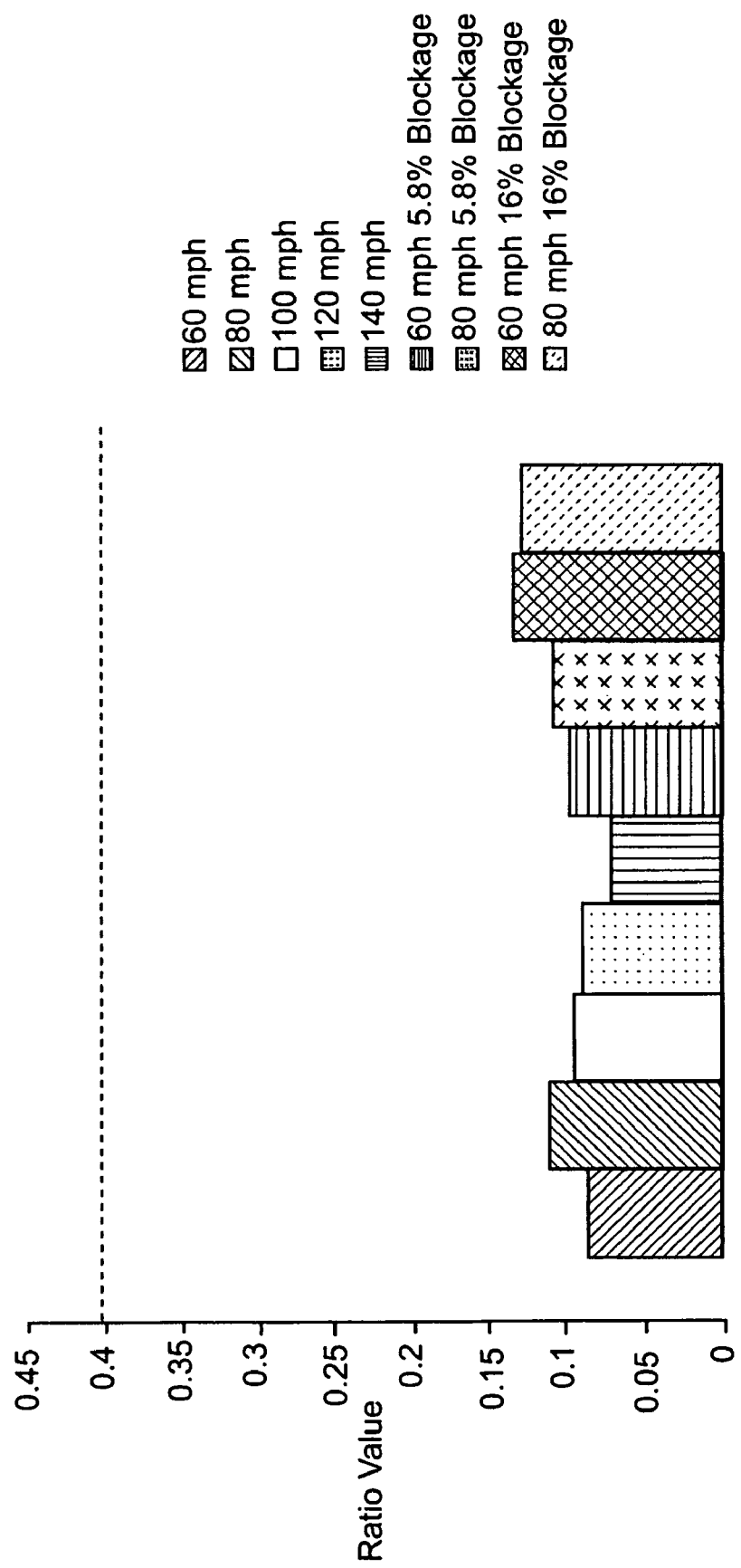
FIGS. 13-18 present additional empirical data relating to some embodiments of the present invention.
Figure 14:
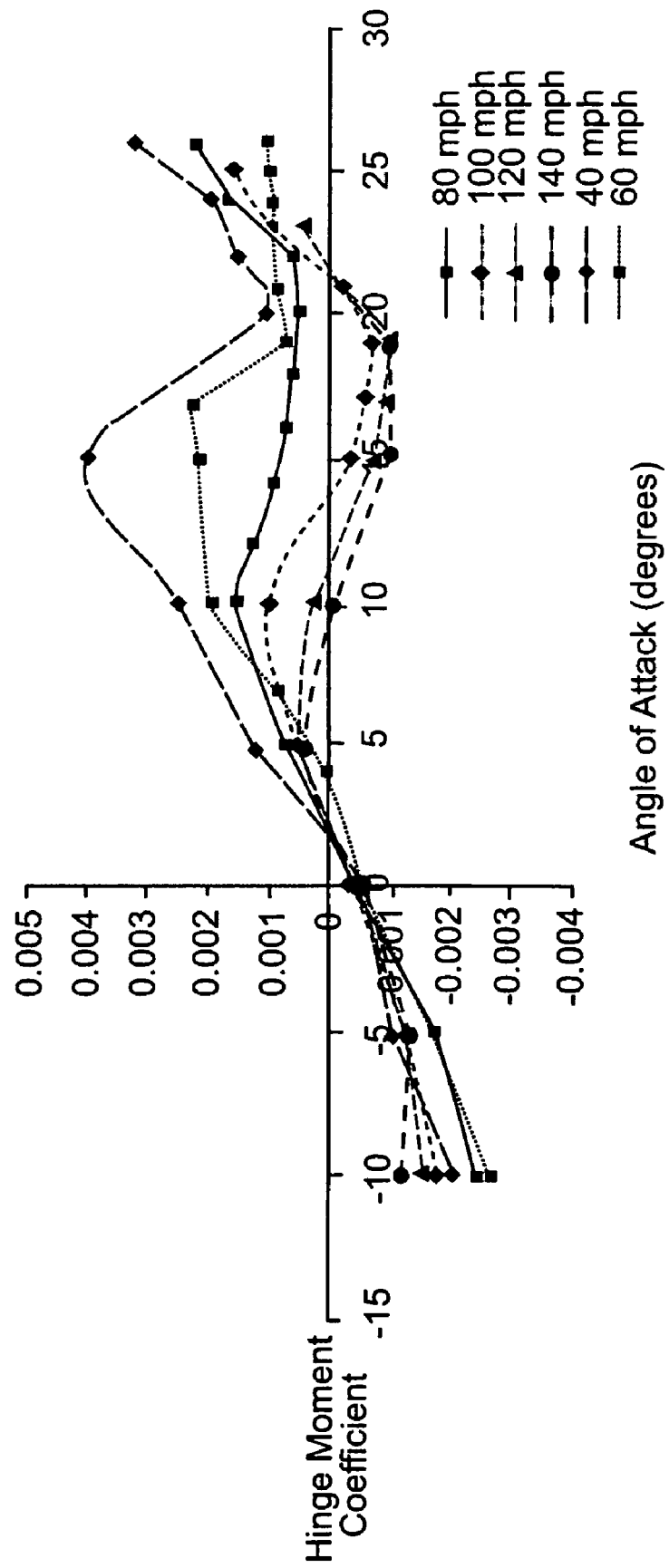
Figure 15:
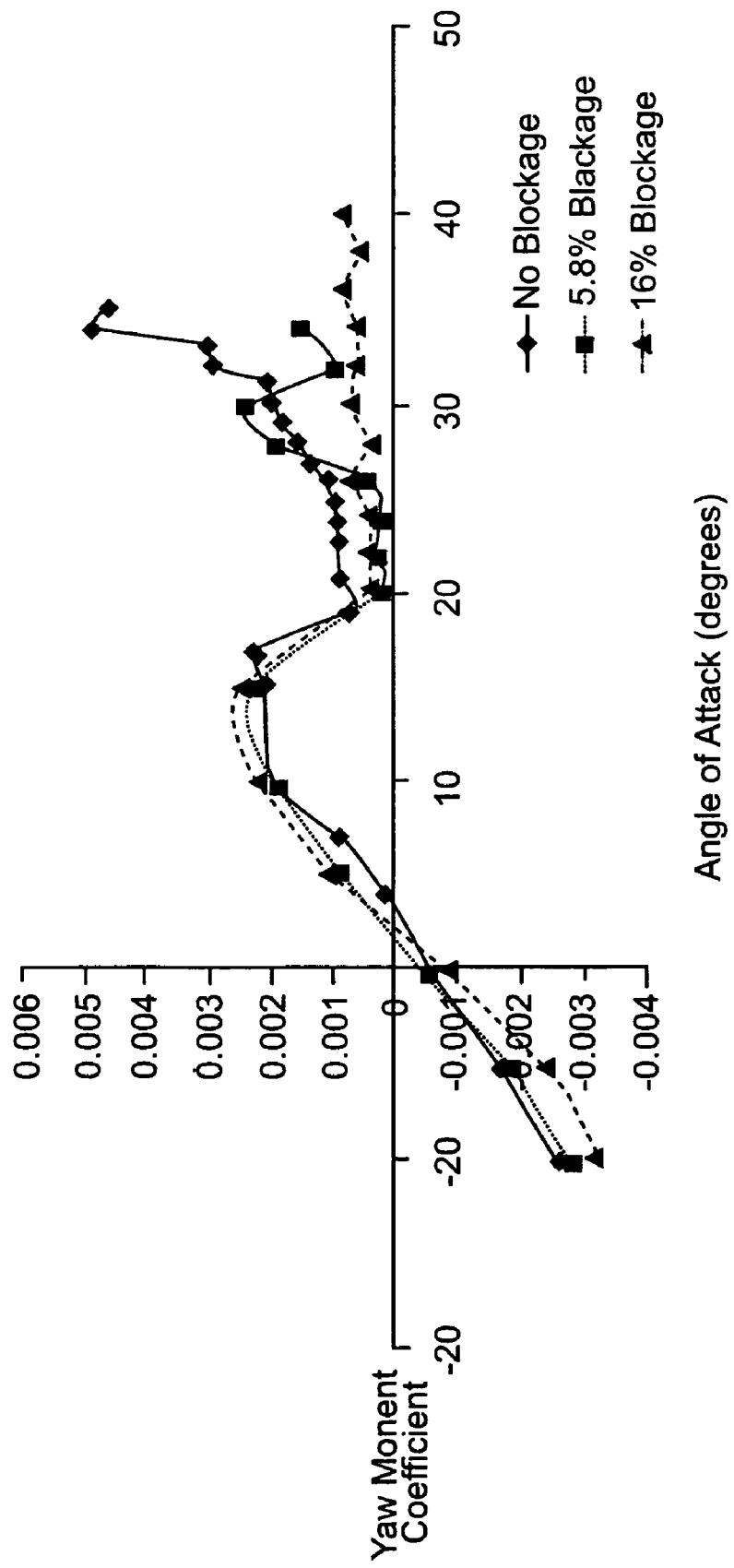
Figure 16:
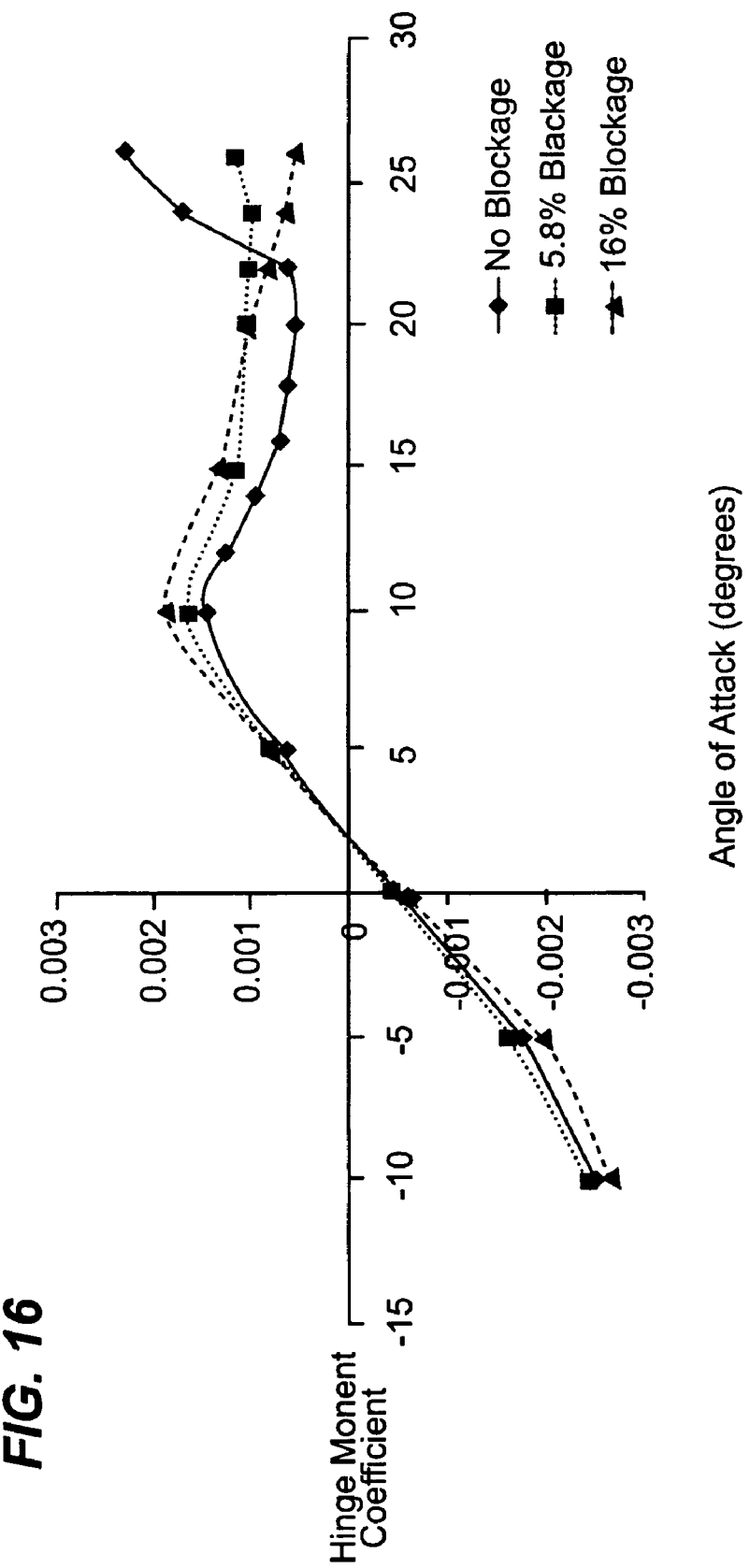
Figure 17:
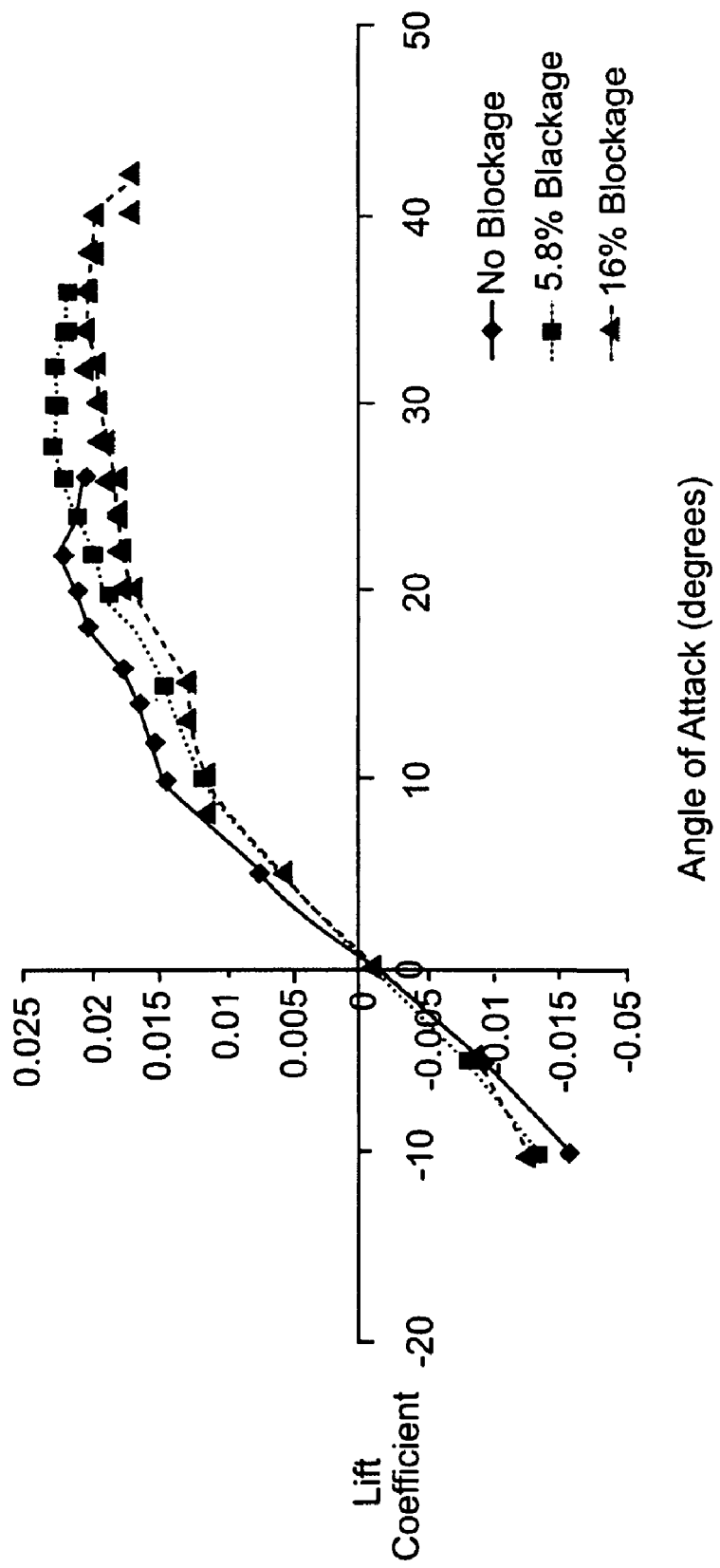
Figure 18:
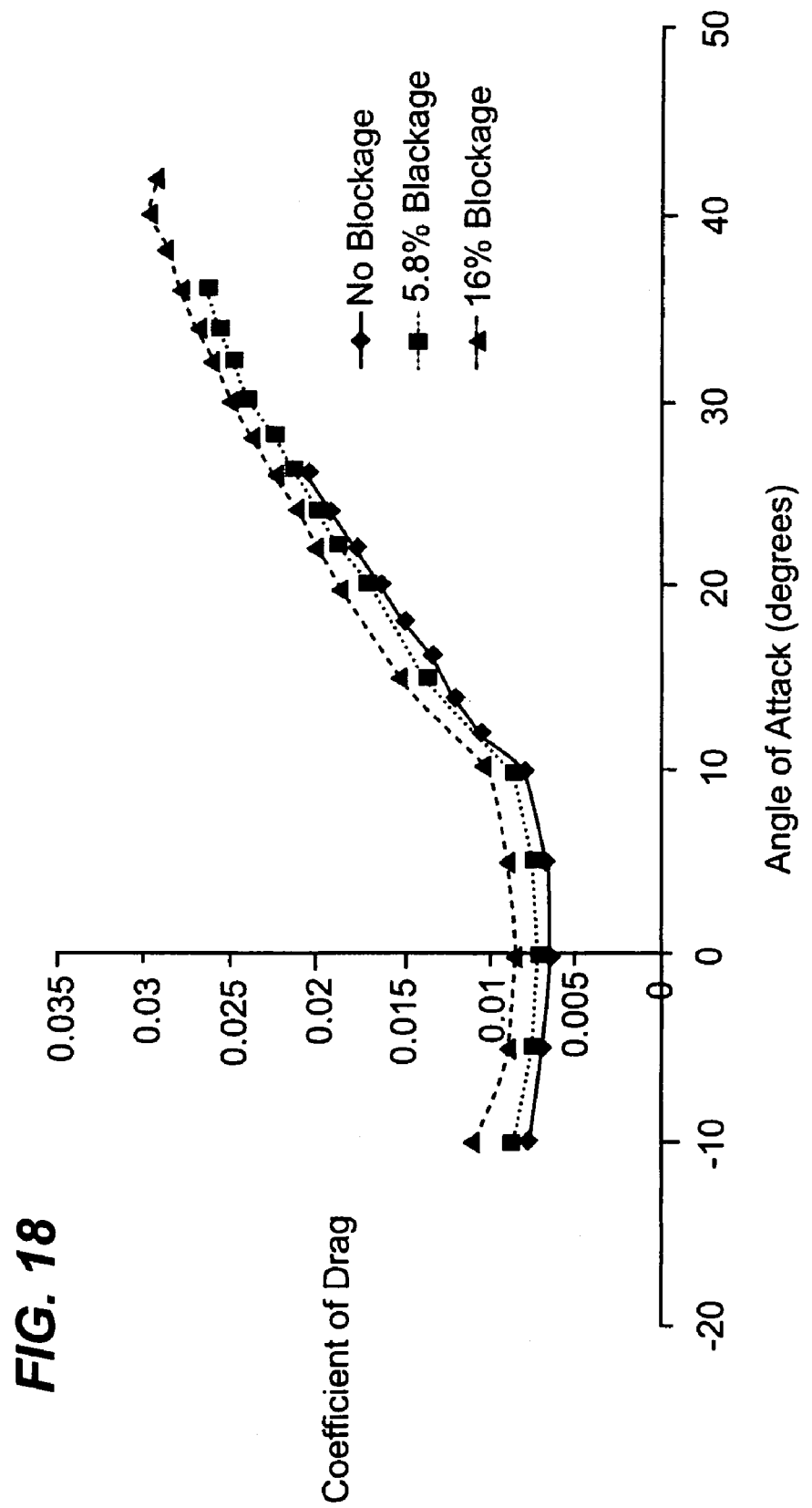

It is further noted that in some embodiments of the present invention may be designed such that the refueling drogue assembly 100 has a minimized hinge moment (i.e., the moment required to move/rotate the duct 400 about the control unit 300). Accordingly, in some embodiments, design of the refueling drogue assembly 100 may include hinge moment as a design constraint. Therefore, the design of the refueling drogue assembly 100 may be such that the hinge moment is not too large, and, in some embodiments, the design will be such that the hinge moment is about that of or below that of a typical control surface, although embodiments of the present invention also include designs where the hinge moment is larger than that of typical control surfaces. Specifically, in some embodiments, the drogue assembly 100 is designed to minimize hinge moment so that less force from the actuators is necessary to move/rotate the duct 400. In exemplary embodiments of the present invention, the ratio of hinge moment coefficient to lift coefficient is about 0.4 or less, and in some embodiments of the present invention, is 0.13 or 0.11 or 0.1. FIG. 13 depicts some exemplary data regarding hinge moment coefficient to lift coefficient ratio ("Ratio Value") vs. various air speeds at various blockage percentages. FIG. 14 depicts exemplary data regarding a comparison of the hinge moment coefficients at various speeds with no blockage, while FIG. 15 depicts exemplary data regarding a comparison of the hinge moment coefficients at a velocity of 60 miles per hour at various degrees of blockage. FIG. 16 presents hinge moment coefficient blockage comparisons at 80 miles per hour, while FIG. 17 presents lift coefficient blockage comparisons at 80 miles per hour. FIG. 18 presents drag coefficient blockage comparisons at 80 miles per hour.

As detailed herein, some embodiments of the present invention utilizing the duct may be practiced with an active control system that actively controls the refueling drogue. The active control system may include the processor 850. By active control, it is meant a control system that may impart forces on the drogue assembly 100, which may include at least a portion of the end of the hose 800 to control/regulate the location of the refueling drogue assembly 100, by moving at least a portion of the duct 400. In some embodiments, the force may be orthogonal to the velocity of the air stream. In some embodiments, it may be used to established a substantially fixed position of the drogue with respect to the refueling aircraft. Active control may additionally suppress lateral translations of the drogue assembly 100 in response to disturbances/turbulence. Active control may be practiced, in some embodiments of the present invention, to counteract the effects of wind gusts and/or cross winds and/or bow wave (induced by the receiver aircraft) etc., that may affect the relative position of the refueling drogue assembly 100, for example, in relation to the refueling aircraft and/or the velocity vector through the air.

It is noted that while the active control system of the present invention is described in terms of maintaining a "fixed" or "desired" orientation of the refueling drogue and/or maintaining a "fixed" or "desired" position/angle of the refueling drogue (sometimes referred to as station keeping), which might be a reference angle and/or a reference position, etc., the active control system, as would be readily understood by one of ordinary skill in the art, in actuality, returns the refueling drogue 100 to its position prior to being displaced due to disturbances and/or substantially minimizes what otherwise would be a large displacement. That is, the refueling drogue, in some embodiments of the present invention, will not be able to maintain a "fixed" position or a "desired" orientation, but will instead be able to return the drogue to the drogue's prior position/orientation/angle quickly enough and/or to minimize the displacement of the refueling drogue assembly 100 such that the refueling drogue may be actively controlled. In one embodiment of the present invention, the active control system reduces the translational movements of the drogue 100 in response to a disturbance such that most or all of the displacement of the drogue is minimal enough that displacement of the drogue 100 does not interfere with aerial refueling and/or create a hazard to the aircraft being refueled. In some embodiments of the invention, disturbances or oscillations are a result of atmospheric turbulence and/or the bow wave effect and/or an impact of the drogue by a refueling probe of a receiver aircraft while attempting to duct with the drogue.

The active control system may be configured so that the position of the drogue may be maintained to a substantially fixed orientation relative to the refueling aircraft 1000 or another reference point. In some embodiments, the orientation may be maintained in moderate turbulence, to within about twelve inches, while in other embodiments the orientation may be maintained within six inches, and in still further embodiments, the orientation may be maintained to within a few inches, and in still further embodiments, the orientation may be maintained within a fraction of an inch. It is noted that by orientation, it is meant a number of possible features, such as, for example, the X-Y, polar or radial (normal to the direction of the free stream velocity) coordinates, the X-Y-Z, polar or radial coordinates, etc., of a fixed point on the refueling drogue assembly 100, which may be, for example, a definable point on the end of the hose 800, a definable point on the control unit 300, a definable point on the refueling drogue receptacle 200 (such as, for example, the center of the ball joint/the center of rotation of the flexible joint that connects the refueling drogue receptacle 200 to the control unit 300, etc.). It is noted that in some embodiments of the present invention, how tightly the position of the refueling drogue 100 may be maintained is a function of the size and/or the configuration of the refueling drogue 100, such that configurations of some refueling drogues will be more conducive to position maintenance than others. Thus, the just mentioned numbers may vary upward and/or downward, depending on the configuration of the refueling drogue utilized to practice the invention.

It is noted that in some embodiments of the present invention, the active control system can be configured to actively control the refueling drogue 100 for substantially any rotation angle of the refueling drogue. Some embodiments may utilize a sensor to measure the rotation angle γ of the refueling drogue with respect to a fixed direction (such as the direction of gravity), and thus the rotation angle γ of the control surfaces with respect to the fixed direction. Some embodiments may utilize a micro electrical mechanical system accelerometer triad and its associated electronics in order to resolve the rotation angle γ. By way of example and not by way of limitation, a pendulum-like gravity vector sensor may be utilized as the vector sensor. In other embodiments of the present invention, a gyroscope may be utilized to determine the rotation angle of the refueling drogue assembly 100, etc.

One embodiment of the present invention may utilize the active control system to change the vertical and/or horizontal position of the refueling drogue assembly 100. In some embodiments of the present invention, the active control system may permit the refueling drogue 100 to maintain a substantially fixed orientation relative to the refueling aircraft 1000 when the refueling aircraft is flying at substantially constant altitude of air speed and/or heading. However, other embodiments of the present invention may be utilized to maintain a substantially fixed orientation of the drogue 100 relative to the refueling aircraft, even though the refueling aircraft is not flying at a substantially constant altitude, air speed, and/or heading. In other embodiments, of the present invention, the active control system may be utilized to "fly" the refueling drogue 100 to the refueling boom of a receiver aircraft.

As detailed above, additional embodiments utilizing the duct 400 may include an active stabilization system, which may include the processor 850. Here, the duct 400 is utilized to impart or generate forces or moments onto the refueling drogue assembly 100 to counter the forces or moments of turbulence or other phenomenon that may make the refueling drogue assembly 100 unstable. Thus, in the first embodiment of the invention, the refueling drogue assembly 100 with the active stabilization system is adapted to effectively stabilize the refueling drogue assembly (e.g., a portion of the tail of the hose 800, the control unit 300, and the drogue receptacle 200, although due to the flexible coupling between the control unit 300 and receptacle 200, the receptacle 200 may be less stable than the control unit 300 and/or the tail of the hose 800) when the refueling drogue assembly 100 is placed in an air stream. In an exemplary embodiment of the present invention utilizing active stabilization, as the drogue passes through the air, the orientation of part or all of the duct 400 may be changed to counteract the effects of turbulence etc. on the drogue 100, and thus stabilize the drogue. In the embodiments according to the present invention, the duct 400 is located on the control unit 300, which is rigidly attached to the refueling hose 800, effectively locating the duct 400 on the hose near the hose/drogue connection. In this regard, the stable reference device may include sensors that detect/determine drogue receptacle movement about the gyroscope. The stable reference device thus dictates a stable reference that may be used to determine a change of orientation of the drogue. This change may be determined, for example, by utilizing the just mentioned sensors to determine the change in orientation of the drogue relative to the gyroscope whose orientation has effectively not changed.

In many respects, an active stabilization system and/or an active control system according to the present invention may be practiced by utilizing components that are similar to and/or the same as components that may be found in an autopilot system on an aircraft. (Although it is noted that in an autopilot system, autopilot controls are based on a plane of symmetry, and thus some embodiments of the present invention utilizing autopilot components/systems account for the fact that some embodiments of the present invention include refueling drogues that have an axis of symmetry as opposed to a plane of symmetry.) That is, the active stabilization system may include sensors that measure drogue axis orientation relative to a reference frame, generate control signals responsive to said measurements and indicative of errors in the measured orientation relative to a desired orientation, and supply said control signals to control surface actuators such that these errors are reduced to substantially zero via the drogue dynamic response resulting from control surface deflection. Still further, components and systems similar to or the same as a fly-by wire system utilized on aircraft may be utilized to achieve active stabilization according to some embodiments of the present invention. Thus, some embodiments of the present invention may utilize any device and/or method which can be implemented to identify an actively stabilized refueling drogue as would be utilized to actively stabilize an aircraft.

It is noted that in some embodiments of the present invention, the control systems utilizing the duct enable the drogue to be "flown" or otherwise moved/directed to the receiver aircraft. In such instances, the receiver aircraft may be stationary with respect to the refueling (tanker) aircraft, or may be moving with respect to the refueling aircraft as well. Indeed, in some embodiments, the refueling drogue may be held stationary with respect to the receiver aircraft. Of course, in other embodiments, the drogue is held substantially stationary and the receiver aircraft has the task of mating with the refueling drogue.

It is further noted that the present invention includes software, firmware and/or computers (including simple logic and/or error circuits) adapted to implement the above stabilization and/or control techniques and/or ducting techniques. Also, while some embodiments of the present invention may be practiced manually (such as, for example, use of an operator to fly the refueling drogue assembly 100 to the receiver aircraft) other embodiments may be practiced automatically. Thus, the present invention includes any device or system that may be configured or otherwise utilized to practice the present invention utilizing a duct as taught herein.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

The invention claimed is:

1. A refueling drogue assembly, comprising:
   a refueling drogue receptacle;
   a control unit including a duct; and
   a refueling hose connector adapted to rigidly couple the control unit to an aerial refueling hose;
   wherein the control unit is flexibly coupled to the refueling drogue receptacle, and
   wherein the control unit is adapted to change an orientation of at least a portion of the duct relative to a longitudinal axis of the control unit.

2. The refueling drogue assembly of claim 1, wherein the control unit is adapted to effectively control location of at least the control unit when the refueling drogue assembly is placed in an airstream.

3. The refueling drogue assembly of claim 1, further comprising a flexible joint coupled to the refueling drogue receptacle and the control unit.

4. The refueling drogue assembly of claim 1, wherein the control unit includes an aviation fuel conduit passing through the duct, the aviation fuel conduit being in fluid communication with the refueling hose connector.

5. The refueling drogue assembly of claim 1, wherein the duct has a cross section of a teardrop airfoil.

6. The refueling drogue assembly of claim 1, wherein the control unit includes a ball joint on which the duct is mounted, wherein the sleeve of the ball joint is adapted to gimble about the ball of the ball joint to change the orientation of the duct relative to a longitudinal axis of the control unit.

7. The refueling drogue assembly of claim 6, wherein the sleeve is adapted to slide about the ball to permit the duct to pitch and yaw in any direction.

8. The refueling drogue assembly of claim 1, wherein the control unit is adapted to morph the duct to change the orientation of at least a portion of the duct relative to the longitudinal axis of the control unit.

9. The refueling drogue assembly of claim 1, wherein the control unit includes an actuator in mechanical communication with the duct, and wherein the actuator is adapted to change the orientation of the duct relative to the longitudinal axis of the control unit.

10. The refueling drogue assembly of claim 9, wherein the control unit further comprises an on-board processor including a logic circuit adapted to automatically output commands to the actuator to direct the actuator to change the orientation of the duct.

11. The refueling drogue assembly of claim 10, wherein the on-board processor is adapted to receive input regarding a performance parameter of the refueling drogue assembly, and wherein the logic circuit is adapted to automatically analyze the input regarding the performance parameter and automatically output a command to the actuator to direct the actuator to change the orientation of the duct in response to the analysis of the input.

12. The refueling drogue assembly of claim 11, wherein the refueling drogue assembly includes at least one of (i) a sensor adapted to gather data regarding refueling drogue assembly performance and (ii) a communication input device adapted to receive input from a remote device regarding at least one of refueling drogue assembly performance and commands to change refueling drogue assembly performance.

13. The refueling drogue assembly of claim 12, wherein the sensor is adapted to gather data regarding at least one of pitch and yaw of the control unit with respect to a free stream airflow.

14. The refueling drogue assembly of claim 13, wherein the communication input device is adapted to receive input indicative of a location of the refueling drogue assembly.

15. The refueling drogue assembly of claim 1, wherein the refueling drogue assembly includes a refueling hose in fluid communication with the refueling drogue receptacle.

16. The refueling drogue assembly of claim 1, wherein the control unit further comprises variable aerodynamic drag components adapted to vary aerodynamic drag of the refueling drogue assembly.

17. The refueling drogue assembly of claim 16, wherein the variable aerodynamic drag components include scoops adapted to move away from and move towards the longitudinal axis of the control unit.

18. The refueling drogue assembly of claim 1, wherein the control unit further comprises an on-board flight control system adapted to control and effectively stabilize the refueling drogue assembly as the refueling drogue assembly is being dragged through the atmosphere.

19. The refueling drogue assembly of claim 1, further including a ram air turbine mechanically coupled to a power generator, wherein the power generator is adapted to provide the refueling drogue assembly with power to change the orientation of at least a portion of the duct relative to a longitudinal axis of the control unit.

20. The refueling drogue assembly of claim 1, wherein the duct is an annular duct.

21. The refueling drogue assembly of claim 1, wherein the control unit includes a fuel conduit extending through the duct.

22. A refueling drogue control and stabilization system, comprising:
the refueling drogue assembly of claim 1;
an active stabilization system controller; and
an active control system controller,
wherein at least a portion of the active stabilization system controller and at least a portion of the active control system controller are located onboard a refueling aircraft remote from the refueling drogue assembly, and wherein the active stabilization system controller and the active control system controller are in communication with the control unit (300).

23. The refueling drogue assembly according to claim 1, wherein the refueling drogue assembly is adapted to maintain a location of a definable point on the control unit to within about an inch relative to at least one of a definable point on a tanker aircraft and a definable point on a receiver aircraft when the refueling drogue assembly is subject to moderate turbulence and a refueling boom of the receiver aircraft is in close proximity to the refueling drogue assembly.

24. A refueling drogue control kit, comprising:
a control unit including a duct;
a refueling drogue connector adapted to flexibly couple the control unit to a refueling drogue receptacle; and
a refueling hose connector adapted to rigidly couple the control unit to an aerial refueling hose,
wherein the control unit is adapted to automatically change an orientation of at least a portion of the duct relative to a longitudinal axis of the control unit.

25. The refueling drogue control kit according to claim 24, further comprising:
an active stabilization system controller; and
an active control system controller,
wherein at least a portion of the active stabilization system controller and at least a portion of the active control system controller are separate from the control unit and are adapted to be placed into wireless communication with the control unit.

26. A method of controlling a refueling drogue, comprising:
at a refueling drogue assembly comprising a refueling drogue receptacle flexibly coupled to a control unit, the control unit comprising a longitudinal axis and a duct,
changing the position of a refueling drogue receptacle by varying an orientation of at least a portion of the duct relative to the longitudinal axis of the control unit.

27. The method of claim 26, further comprising automatically varying the orientation of at least a portion of the duct to maintain a substantially fixed location of the refueling drogue receptacle with respect to at least one of the refueling aircraft and a refueling boom on a receiver aircraft in close proximity to the refueling drogue receptacle.

28. The method of claim 26, further comprising automatically actively stabilizing the refueling drogue by varying the orientation of at least a portion of the duct.

29. The method of claim 26, further comprising maintaining a location of a definable point on the refueling drogue assembly on or in close proximity to the refueling drogue receptacle to within about an inch relative to at least one of a definable point on a tanker aircraft and a definable point on a receiver aircraft when the refueling drogue assembly is subject to moderate turbulence and a refueling boom of the receiver aircraft is in close proximity to the refueling drogue assembly.

* * * * *